Aug. 16, 1966 H. R. JENSEN, JR 3,267,442

MEMORY MATRIX

Filed Oct. 16, 1961 2 Sheets-Sheet 1

INVENTOR
HOLGER R. JENSEN, JR.
BY Leo J. Aubel
ATTORNEY

Aug. 16, 1966 H. R. JENSEN, JR 3,267,442

MEMORY MATRIX

Filed Oct. 16, 1961 2 Sheets-Sheet 2

United States Patent Office 3,267,442

Patented August 16, 1966

3,267,442

MEMORY MATRIX

Holger R. Jensen, Jr., Endicott, N.Y., assignor to International Business Machines Corporation, New York, N.Y., a corporation of New York Filed Oct. 16, 1961, Ser. No. 145,205

2 Claims. (Cl. 340—174)

Figure 1A:
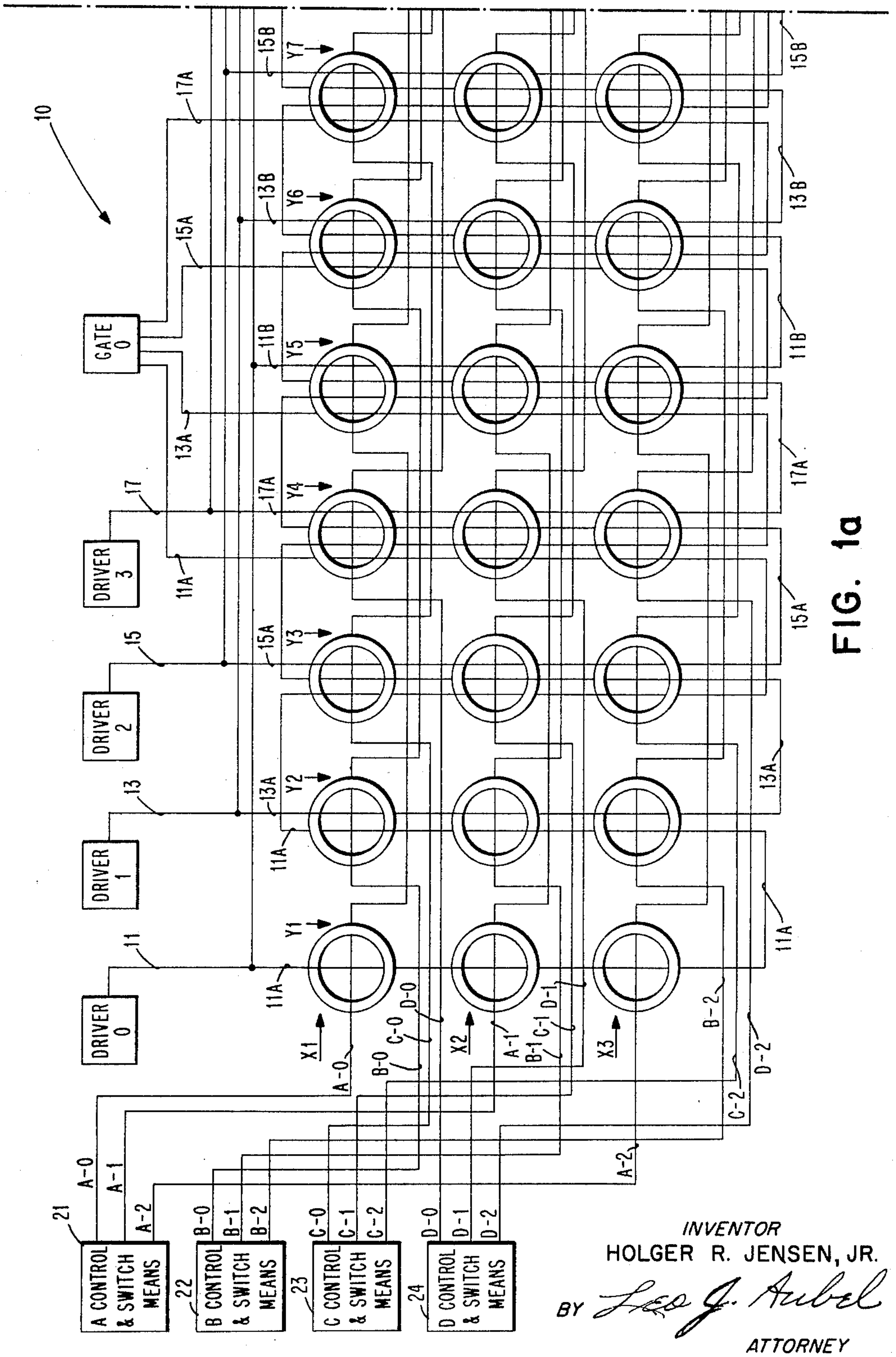

This invention relates to a memory matrix and more specifically to a memory matrix for addressing a desired number of characters beginning at any randomly selected position.

In prior art memory matrices or arrays, simultaneous selection of the characters comprising a complete word requires the words to be in assigned permanent locations within the matrix or array and the relative position of the characters in a given word fixed. Otherwise, if it is desired to select a word beginning at any random location, it is necessary to serially select the characters comprising the word.

It is a principal object of the present invention to provide a memory matrix in which consecutive memory characters indicating a particular word may be selected simultaneously beginning with any randomly chosen location.

It is another object of the present invention to provide a memory matrix in which a number of memory characters can be simultaneously selected.

It is another object of the present invention to provide a memory matrix in which words are comprised of randomly selected adjacent characters.

In the attainment of the foregoing objects and in one particular embodiment of the invention, there is provided a plurality of bistable elements arranged in a rectangular configuration of rows and columns. Driver means are electrically coupled to one terminal of associated drive lines and respective gate means are connected to the other terminals of the associated drive lines. By controlling the driver means and the gate means, current is caused to flow through selected ones of the drive lines in selected patterns. Each of the drive lines passes through a group of elements; said groups being divided in subgroups of elements, where each subgroup represents a character of a word. Inhibit lines pass through the cores of each subgroup and are arranged to permit the drive lines to shift the stable state only selected cores in the subgroup to provide an indication of a character. One of said drivers and one of said gates are actuable to energize a particular group of elements, while other drivers and gates being actuable to energize succeeding groups of elements.

The foregoing and other objects, features and advantages of the invention will be apparent from the following more particular description of preferred embodiments of the invention, as illustrated in the accompanying drawings.

Figure 1B:
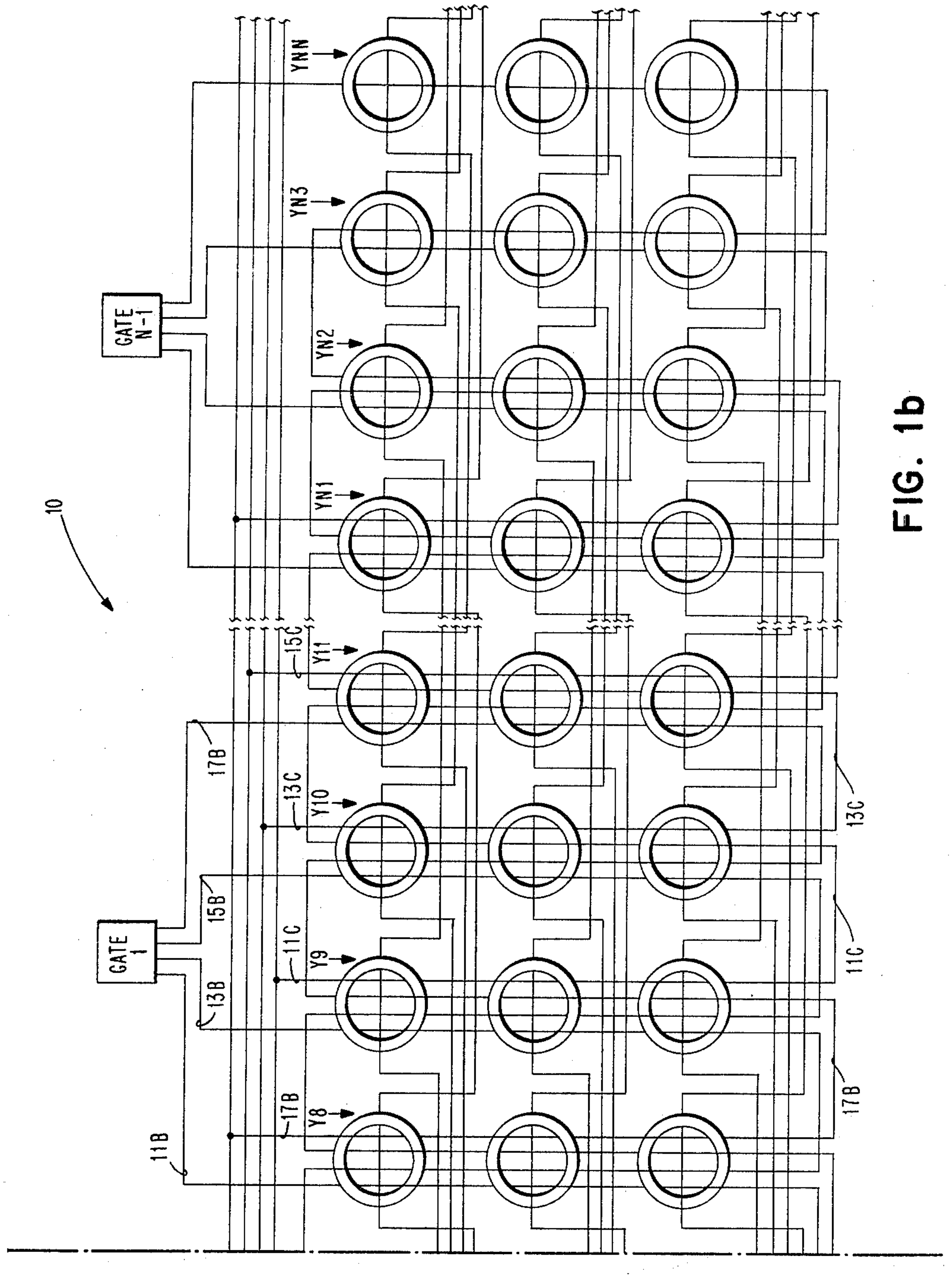

In the drawings:

FIGS. 1*a* and 1*b* show a schematic diagram of a memory matrix or array in accordance with the invention.

Referring to the drawings, a matrix 10 is comprised of bistable elements in the form of magnetic cores indicated by circles. The cores which have two stable states of magnetization, namely a reset and set state and which cores may be of any suitable known type, are arranged in a pattern which, for purposes of explanation, may be a rectangular configuration with the column of cores being indicated generally by the letter Y and the rows of cores being indicated generally by the letter X.

In the particular embodiment of FIGS. 1*a* and 1*b*, there are three rows of cores indicated as X1, X2, and X3; and there are *n* columns of cores numbered Y1–Y11 . . . YN1–YNN. For purposes of this description, the cores will be individually designated by their relative position in the rows and columns of the matrix. For example, core X1Y1 is in the first row and first column of the matrix.

It should be understood at the outset that the relatively simple configuration of the memory matrix 10, FIGS. 1*a* and 1*b*, is provided in order to facilitate the description of the invention. The number of cores in each row and column can be increased; there is no specific limit as to the number of cores used.

Bilateral current drivers 0, 1, 2 and 3, of any suitable known type, provide current flow of full select amplitude through the associated bus lines 11, 13, 15 and 17 to the various drive lines 11A, 13A, etc., 11B, 13B, etc., which wind or pass through the cores in the matrix. As is known, the term full-select refers to a current of an amplitude sufficient to cause the bistable elements to shift from one to the other of their stable states. The various drive lines are connected from the bus line in parallel. For example, note drive lines 11A, 11B and 11C which are connected to bus line 11. Likewise, note drive lines 13A, 13B and 13C which are connected to bus line 13. The drive lines terminate in respective gates 0, 1, . . . *N*—1, as will be explained more fully hereinbelow.

The drive lines are wound through the cores in distinct patterns. More specifically, each drive lines is wound to pass through four consecutive columns of cores, and adjacent drive lines pass through adjacent columns of cores. In the figures, because the drive lines enter a column from a first direction and then bend back and enter the succeeding column from the other direction, each drive line is wound to pass through adjacent columns of cores in relatively opposite sense so that current flowing in a line will tend to shift the cores toward the same stable state. The direction in which a drive line passes through a core as shown in FIGS. 1*a* and 1*b* indicates the winding sense. Note, for example, drive line 13A which is wound through the cores in column Y2 in one direction and through the cores in column Y3 in the opposite direction. The energizing path of drive line 13A is traceable from driver 1 through bus line 13 down (as oriented in FIG. 1*a*) through the cores in column Y2, up through column Y3, down through column Y4 and up through column Y5 to gate 0.

As will be appreciated, current flowing through the drive lines in a first direction will cause the cores to tend to shift to one stable state; current flowing through the drive lines in a second direction will cause the cores to tend to shift to the other stable state.

Control lines labeled A–0, A–1, A–2, B–0, B–1, B–2, C–0, C–1, C–2 and D–0, D–1, D–2 are employed both as inhibit lines and as sense lines. The control lines are coupled to any suitable known control and switch means labeled respectively A, B, C and D and numbered 21, 22, 23 and 24 which provide a current to the respective lines during the write cycle of the operation. The switch means which are of any suitable known type, such as electronic switches, connect to energize sense amplifiers, not shown, of any suitable known type, during the read cycle.

During the write cycle, the A, B, C and D controls are each activated to provide an inhibit current to two of their three respective lines, for example, a control will energize say, A–0, A–1 and not A–2 during write cycle. The inhibit lines will have a current flowing therethrough that will induce a flux in the associated cores which will oppose the flux induced by the drive lines.

The control lines providing the 0 bit control, that is, the A–0, B–0, C–0 and D–0, pass through the first row of cores X1; the control lines providing the 1 bit control are wound through the second row of cores X2; and, control lines providing the 2 bit control are wound through the third row of cores X3.

The A control lines are wound through the cores in columns Y1, Y5, Y9, Y13, etc., in each row; the B control lines are wound through the cores in succeeding columns Y2, Y6, Y10, Y14, etc., in each row, the C control lines are wound through the cores in columns Y3, Y7, Y11, Y15, and the D control lines are wound through cores Y4, Y8, Y12, Y16.

In this particular embodiment, each word comprises four characters and each character comprises three bits. The three cores in each column, e.g., X1Y1, X2Y1, X3Y1, in a row, contain the three bits of a character, while four columns of cores, e.g., X1Y1, X1Y2, X1Y3, X1Y4, energized simultaneously represent the four characters of the selected word.

The operation of the circuit of the memory matrix circuit of FIGS. 1*a* and 1*b* will now be described.

Assume initially all the cores are in an initial reset stable state. Assume also, for example, that driver 1 is activated to provide current flow and gate 0 is closed to complete the circuit that is, current will flow through a path traceable from driver 1, bus line 13, drive line 13A and thence through gate 0. All the cores in column Y2, Y3, Y4 and Y5, a total of 12 cores, will tend to be shifted to one stable state, say, their set state.

To read information into core matrix 10, the control lines provide inhibit energization to generate an *m*/*n* code, in this case, a 1/3 code. More specifically, each inhibit line if energized provides current to the associated cores to oppose the setting effect of the drive line current. The cores into which data is to be entered will not have an inhibit current flowing through the control lines and thus these cores will shift to a set state.

Assume that the code of the first character (column Y2) is 010; of the second character (column Y3) is 010; of the third character (column Y4) is 001; of the fourth character (column 5) is 100. In this instance, control lines B–0 and B–2 have current flowing therethrough; control line B–1 is not energized; thus core X2Y2 is caused to shift to a set stable state. Likewise, control lines C–0 and C–2 are energized and C–1 is not energized permitting core X2Y3 to shift to a set state. Similarly control lines D–0 and D–1 are energized, D–2 is not energized, core X3Y4 shifts to a set state. Control lines A–1 and A–2 are energized, line A–0 is not energized permitting core X1Y5 to shift to a set state.

At this point, a word comprised of four characters indicated by columns Y2, Y3, Y4 and Y5 and having a coding 010, 010, 001, 100 will be written into matrix 10.

During a succeeding read cycle, the direction of current flow through driver 1 and through the control line 11A is reversed and the switch means are actuated to connect the control lines to the associated sense amplifiers not shown. If desired for some reason, it is apparent that the inhibit lines and the control lines could be separate and separately controlled. All the cores that have been shifted to a set state will be reset to provide an output through the associated sense lines. In this foregoing example, cores X2Y2, X2Y3, X3Y4 and X1Y4 will be reset to provide an output on control lines B–1, C–1, D–2 and B–0.

Assume driver 2 and gate 0 are next activated, the word addressed will comprise the characters in columns Y3, Y4, Y5 and Y6. If driver 3 and gate 0 are activated, the word addressed will comprise the characters in columns Y4, Y5, Y6 and Y7.

To address a word comprised of the characters in columns Y6, Y7, Y8 and Y9, driver 1 and gate 1 would be activated.

Each of the drivers 0, 1, 2 and 3 may be arranged to provide a current of half-select amplitude to its associated bus lines and thus to the associated drive lines; and, the control units 21, 22, 23 and 24 may be arranged to provide an enabling rather than an inhibiting function. More specifically, a current of half-select amplitude selectively combines with the drive line current to cause a selected core to shift stable states. In this instance one of the three control lines from each control unit 21, 22, 23 and 24 would be energized to have an enabling current flowing therethrough and the other two lines would not be energized.

A three dimensional type of selection may be obtained by providing another drive line through the columns of cores and providing a current of half-select amplitude through this other drive line and through the drive lines 11A, 11B, 11C, etc.

For three dimensional selection, the inhibit lines and the sense lines would be separate lines, and the inhibit lines would provide currents opposing the energization of all but the selected cores.

In the FIGURES 1*a* and 1*b*, for simplicity in the drawings, the drive lines are shown as connected in parallel to the associated bus lines. It has been found that in some cases noise may be reduced by connecting each of the drive lines directly to the drivers; however, the operation of the circuit is the same as described above.

The circuitry of the invention, thus provides a group of sequential addresses in a memory matrix, and first and second address means, namely the drivers and the gates respectively. The first address means are arranged to specify the initial address in the sequence of characters to be accessed and the second address means are arranged to specify the final address in the sequence.

While the invention has been particularly shown and described with reference to preferred embodiments thereof, it will be understood by those skilled in the art that the foregoing and other changes in form and details may be made therein without departing from the spirit and scope of the invention.

I claim:

1. In a memory matrix, an array of bistable magnetic cores where the state of a core is indicative of a binary bit "1" or "0," where the combined states *m* of a series of cores (A1, A2, A3 . . .) is representative of a character B, wherein a number of cores representing characters B1, B2, . . . B*n* equal in number to a constant *n* represents a word, the improvement comprising:

(a) a separate winding beginning with each successive set of cores representing a character B1, B2, . . . B*n* in said array threading successive sets of cores of a number equal to the value *n* and terminating with a set of cores representing the last character of said number of characters, (b) circuit means connecting the termination of adjacent windings together with a number of other windings to form a group of windings equal to the constant *n*, and operable, when selected, to complete a circuit for the windings, (c) means connecting together the beginnings of all separate windings (a) spaced apart by the constant *n*, (d) control means for selectively completing a circuit to the beginnings of the connected winding of (c) above so that the cores threaded thereby may be set to a first or second stable state by current through the established circuit whereby a number of cores equal in number to the characters in a word of data are selected by the completion of said circuit means (b) above and any separate winding (a).

2. The apparatus of claim 1 further including:

(a) a plurality of separate inhibit windings equal in number to the number of bits in a character *m* multiplied by the number of characters in a word *n*, (b) a unique inhibit winding threading a single core in *n* successive sets of cores for controlling the state of the selected core, (c) and control means individual to the cores representing characters spaced apart by a number *n* for driving said inhibit windings to control the storage of information.

References Cited by the Examiner

UNITED STATES PATENTS

| | | | |
|---|---|---|---|
| 2,802,203 | 8/1957 | Stuart-Williams | 340—174 |
| 2,920,315 | 1/1960 | Markowitz et al. | 340—174 |
| 3,007,141 | 10/1961 | Rising et al. | 340—174 |
| 3,027,546 | 3/1962 | Howes et al. | 340—174 |

BERNARD KONICK, *Primary Examiner.*

IRVING SRAGOW, *Examiner.*

R. R. HUBBARD, H. D. VOLK, *Assistant Examiners.*